United States Patent
Jorgensen et al.

[11] Patent Number: 5,115,685
[45] Date of Patent: May 26, 1992

[54] TORQUE METER

[75] Inventors: Geert Jorgensen, Nordborg; Torben Jensen, Sondergade; Niels Gade, Hojlund, all of Denmark

[73] Assignee: Danfoss A/S, Nordborg, Denmark

[21] Appl. No.: 529,507

[22] Filed: May 29, 1990

[30] Foreign Application Priority Data

Jun. 9, 1989 [DE] Fed. Rep. of Germany ....... 3918862

[51] Int. Cl.$^5$ .................................................. G01L 3/10
[52] U.S. Cl. .................................................. 73/862.33
[58] Field of Search ........................ 73/862.33, 862.32

[56] References Cited
U.S. PATENT DOCUMENTS

| | | | |
|---|---|---|---|
| 2,432,900 | 12/1947 | Jacobsen | 73/862.33 |
| 2,754,683 | 7/1956 | Waugh | 73/862.33 |
| 3,823,608 | 7/1974 | Pantermuehl | 73/862.33 |
| 5,009,110 | 4/1991 | Lang et al. | 73/862.33 |

Primary Examiner—Charles A. Ruehl
Attorney, Agent, or Firm—Wayne B. Easton; Clayton R. Johnson

[57] ABSTRACT

The torque meter has a shaft with a reduced diameter intermediate portion with a sleeve that at its axial opposite ends is in fixed axial and rotational relation thereto. The sleeve intermediate portion has circumferentially extending lugs that are joined to the sleeve end portions. The lugs circumferentially opposite their juncture to the sleeve end portion mount an armature. The rotation of the sleeve ends relative to one another axially displaces the armature and changes an electric or magnetic field. At least one coil is in fixed axial and rotational relationship to the sleeve for detecting a change in the field for measuring the torque.

16 Claims, 3 Drawing Sheets

TORQUE METER

The invention relates to a torque meter comprising a shaft with a section of reduced diameter, a sleeve which is fixed to the shaft at both sides of the reduced diameter section against rotation and axial displacement and carries an armature which, upon rotation of the two sleeve ends towards each other, is axially displaced and changes an electric and/or magnet field, and means for detecting the change in the field.

In a known torque meter (U.S. Pat. No. 2,737,049), the shaft has a section of reduced diameter so that, when a torque acts on the shaft, turning of the two shaft ends will take place mainly in the region of the section of reduced diameter. Rotation of the shaft portions at both sides of the reduced diameter section is measured with the aid of a sleeve. The sleeve has a central portion which is connected to one end of the sleeve by way of webs extending at an angle to the axis of the shaft and to the other end of the sleeve by way of a kind of folded bellows. If the two shaft ends and thus the two sleeve ends are turned relatively to each other, the central portion will move slightly in the axial direction under the influence of the webs. An armature secured to the central portion changes the inductance of two coils disposed in the means for detecting the change in field. This change can be measured by way of a bridge circuit which, for example, is fed with an A.C. voltage. The known generator is comparatively large and produces only a relatively weak and inaccurate output signal.

The present invention is based on the problem of providing a torque meter which is of compact construction and able to generate a stronger output signal.

This problem is solved in a torque meter of the aforementioned kind in that the armature is secured to one end of a lug of which the other end is connected to both sleeve segments.

Upon rotation of the two sleeve segments relatively to one another, movement will take place at the end of the lug to which the armature is secured and this movement is amplified by the ratio between the spacing of the two sleeve segments and the length of the lug. The narrower the spacing between the two sleeve segments and the longer the lug, the greater will be the deflection of the tip of the lug. With the same rotation of the sleeve ends relatively to each other, one thereby achieves a far greater axial movement of the armature which can be converted to a stronger signal without having to enlarge the sleeve.

In a preferred embodiment, the lug extends substantially between the sleeve segments and its longitudinal axis in the rest position lies in a plane perpendicular to the axis of the shaft. The lug is thereby curved in the same manner as are the two sleeve segments. The lug will therefore not project beyond the outer diameter of the sleeve. Nevertheless, one can achieve amplification up to a certain degree of the deflection of the end of the lug at which the armature is arranged. The maximum deflection will be achieved when the lug extends over a distance corresponding to more than half the circumference of the sleeve. By reason of the fact that the lug in the rest position, i.e. when a torque acts on the shaft, lies in a plane perpendicular to the shaft axis, the same starting situation is provided for a positive as well as a negative torque. Both signs of the applied torque can thus be measured in the same manner without any problem.

Advantageously, the connection between the lug and each sleeve segment is by way of a respective web which extends at least partially in the circumferential direction. When the two sleeve segments rotate relatively to each other, the end of the lug connected to the two sleeve segments places itself obliquely in the gap separating the two sleeve segments. This shortens the projection of this end of the lug in the gap. The construction according to the invention takes up this shortening by the spring effect of the two webs. The connection between the sleeve and shaft remains practically axially unstressed.

In a particularly preferred embodiment, at least two lugs are uniformly distributed in the circumferential direction to carry the armature. This achieves secure mounting of the armature at two diametrically opposed points of the two lugs or at a plurality of circumferentially uniformly distributed supporting points.

Advantageously, the sleeve is made from a non-magnetic material. In particular, if the change in a magnetic field is used to evaluate the torque, only the armature and its axial motion will influence the magnetic field, not the sleeve.

Advantageously, the sleeve segments and the lug or lugs are made in one piece. The lug is therefore separated from the two sleeve segments by slots which extend substantially in the circumferential direction. The entire sleeve, including the lugs, is thus produced from a homogeneous material in which hardly any or very little hysteresis occurs. In addition, this achieves a system which is very stable mechanically. In one example, a factor of more than 1,000 was achieved between the smallest and largest measured torque. In addition, this permits the torque meter to be made very compact.

In a preferred embodiment, the means for detecting the change in field comprise at least one coil which is fixed against axial displacement and rotation relatively to the sleeve, particularly with the aid of slip-free bearings of which the inner ring is disposed on the sleeve and the outer ring in a coil carrier. Detection of the change in a magnetic field can be relatively simple. The magnetic field is substantially unaffected by external influences such as temperature, air humidity etc. Disruptions that can occur during operation are thereby substantially avoided. The coil may be stationary, i.e. non-rotating, which considerably simplifies the derivation of a measuring signal. No sliding contacts need be provided which could falsify the measuring signal. Mounting the bearing on the sleeve instead of on the shaft permits more accurate positioning of the coil in relation to the armature.

Preferably, the means for detecting the change in field comprise a primary coil producing a magnetic field and two secondary coils each producing an output signal, the armature changing the magnetic coupling between the primary and secondary coils upon axial displacement. These field change detecting means can also be employed without special suspension of the armature on the lugs if one makes sure that the armature moves axially upon rotation of the two sleeve ends relatively to each other. The arrangement according to the invention ensures that, upon movement of the armature in both directions from a neutral position defined by the primary coil, output signals are produced by the secondary coils that are proportional to the rotation of the two sleeve ends relatively to each other and thus proportional to the measured torque. The use of a primary coil as a field-producing coil and two secondary coils as sensing coils has the advantage that the excitation, i.e. the input signal, is substantially uncoupled from the measured value, i.e. the output signal. According to the invention, the change in the field is indeed substantially detected. Changes in the properties of the coils or the other components can therefore be more readily recognised and compensated.

In a preferred embodiment, the primary coil surrounds the sleeve in the region of the armature and on each side of the primary coil there is one of the secondary coils, the armature being disposed at least partially within the primary coil and being formed of magnetically conductive material.

The field change detecting means are therefore in the form of a linear differential transformer, in the primary coil of which a constant magnetic flux is produced. The flux is closed by the two secondary coils. In the neutral position, the armature is symmetrical to both secondary coils so that the flux is symmetrically distributed in the two secondary coils and consequently also traverses an equal number of windings. By displacing the armature, the field will be larger in one secondary coil and less in the other secondary coil, so that the symmetry is upset and the field distribution and thus the flux in both secondary coils will change. In the secondary coil into which the armature is inserted more deeply, the magnetic field intersects a larger number of coil windings and therefore for example induces a larger voltage than in the other secondary coil in which a smaller number of coil windings are intersected by the magnetic field. By reason of the fact that the two coils are influenced by the armature in opposite senses, one achieves a differential effect which is employed for amplifying the measuring signal.

Considerable requirements are placed on the mounting of the coil arrangement with regard to its freedom of play in the axial direction. One must ensure that the armature assumes its neutral position in the absence of a torque and cannot be brought out of its neutral position by displacing the coil arrangement relatively to the shaft. To reduce the requirements on the bearings in this respect, an axially undisplaceable second armature is preferably disposed on the shaft for changing the magnetic coupling between a second coil arrangement containing one primary and two secondary coils upon movement of the shaft, the second coil arrangement being connected to the first at an axially constant spacing. Advantageously, both coil arrangements are identical in construction. This permits one to determine reliably whether an output signal is produced by movement of the armature brought about by an applied torque or whether it is merely relative motion between the coil arrangement and shaft. The torque can, for example, be measured as a difference between the two output signals of the two coil arrangements.

In another preferred embodiment, the primary coil is disposed on the central limb of an E-shaped core and the two secondary coils are on the two outer limbs of the core, the armature being arranged at a constant air gap from the central limb and between the two outer limbs of the core. This achieves the principle of a reluctance meter. In a reluctance meter, the entire magnetic flux produced by the primary coil constantly passes through all secondary windings. By changing the size of the magnetic flux, for example by increasing or reducing the magnetic resistance by increasing or reducing an air gap in the magnetic circuit, the voltage produced in the respective secondary windings is changed proportionally to the movement of the armature.

In a preferred embodiment, the coils of the means for detecting the change in field are surrounded by a magnetically conductive cap. This magnetically conductive cap on the one hand ensures that no external interference can falsify the measuring results. On the other hand, the magnetically conductive cap forms a path for the magnetic flux by way of which the field lines can close. With a reduced excitation energy, one can thus derive a stronger output signal.

Advantageously, the cap is connected to the sleeve against axial displacement and comprises at least one compensating air gap which, upon axial displacement of the coil arrangement relatively to the sleeve, changes the magnetic coupling between the primary coil and the secondary coils in the opposite sense to the influence by the armature. Interference that might arise by relative axial motion between the coil arrangement and the sleeve will thus be directly compensated. The armature will then lead the field so that a larger number of coil windings of one secondary coil are traversed by the field. However, at the same time, by reason of the compensating air gap of the cap which is displaced together with the armature, the magnetic resistance for the field traversing this secondary coil is increased so that a larger number of coil windings may be traversed by the magnetic field but the magnetic field is so weakened that no change in the output signal will occur.

In a preferred embodiment, the compensating air gap is formed by a circumferential gap in the cap in the region of the primary coil. With correct dimensioning, one can thereby achieve the desired effect. In particular, it is advantageous for the gap to be at least as wide in the axial direction as is the primary coil.

Preferred examples of the invention will now be described with reference to the drawing, wherein.

Figure 3:
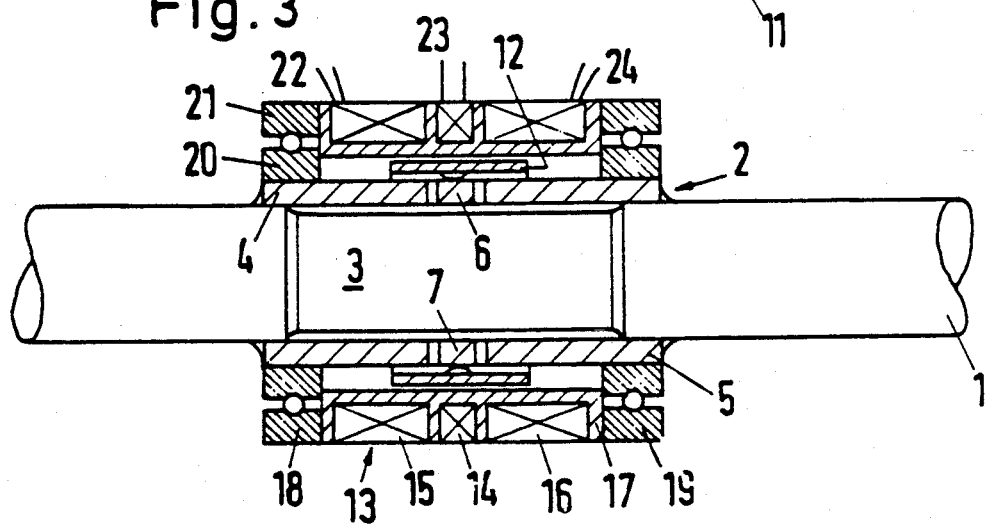
Figure 4:
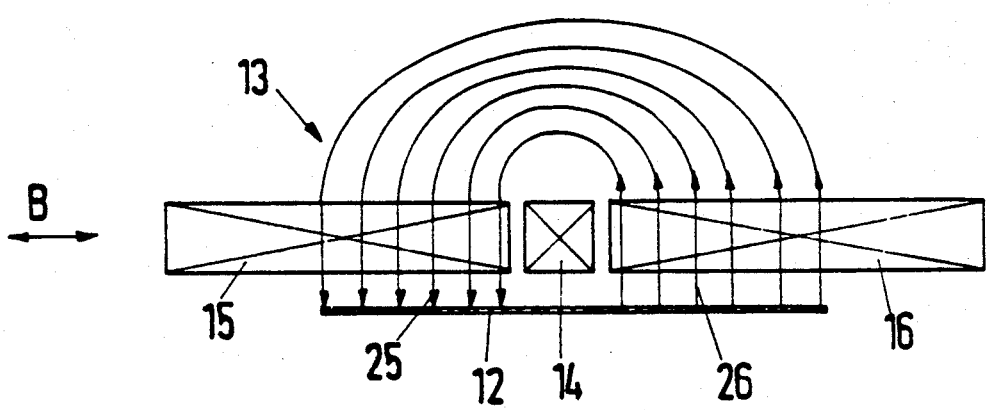
Figure 5:
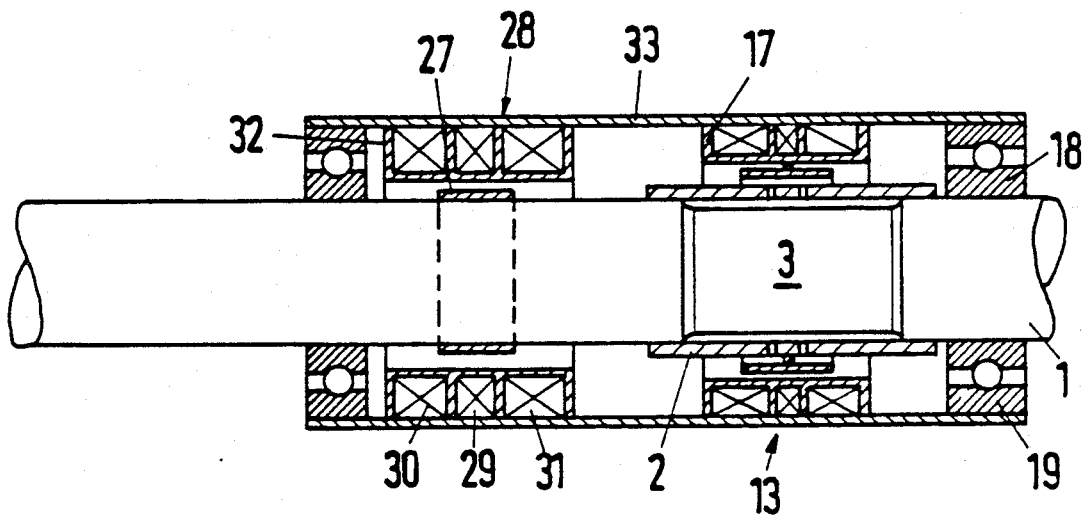
Figure 6:
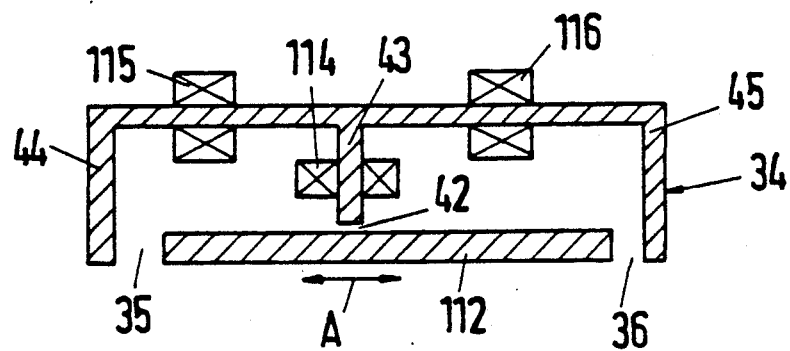
Figure 7:
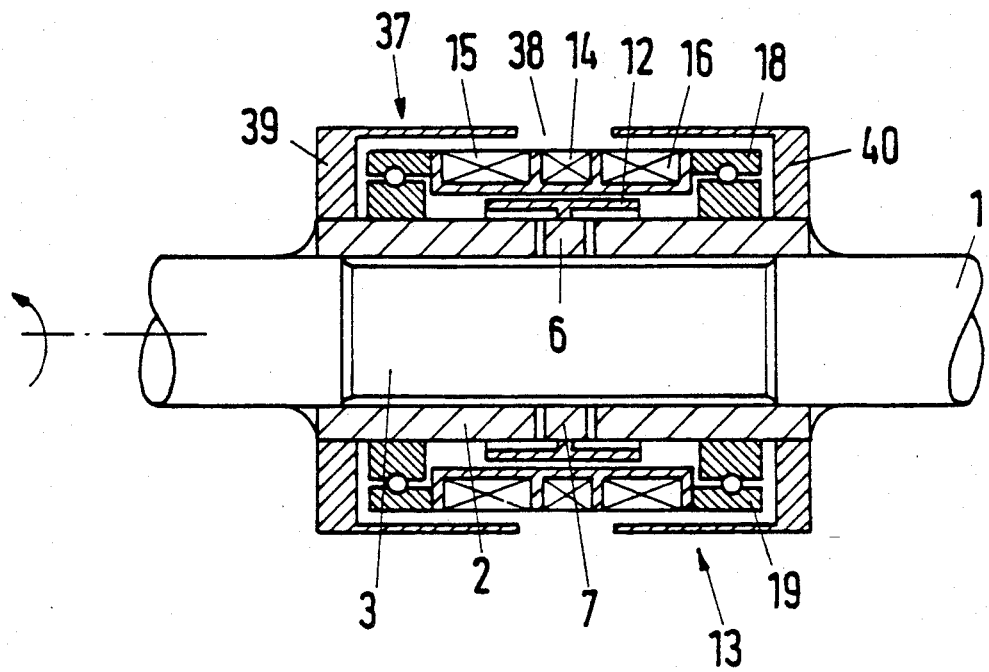
Figure 8A:
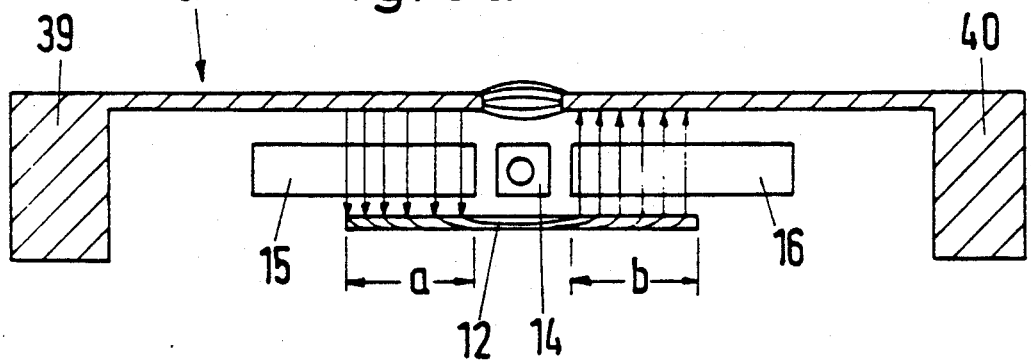
Figure 8B:
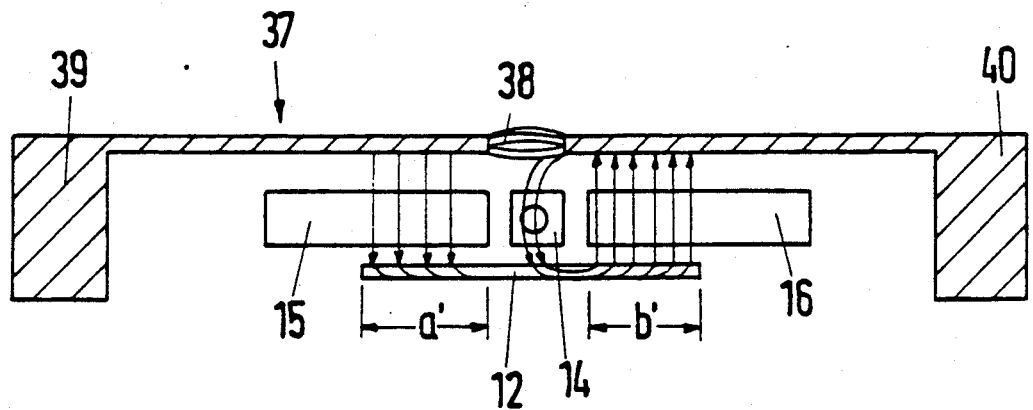

FIG. 3 is an axial section of the torque measuring shaft with a coil arrangement, FIG. 4 is a diagrammatic representation for explaining the function of the coil arrangement, FIG. 5 is a further embodiment with compensating means, FIG. 6 is a diagrammatic representation of further means for detecting the change in field, FIG. 7 is a further torque meter, and FIGS. 8a and 8b are diagrammatic representations for explaining the principle of the FIG. 7 meter.

A torque measuring shaft of a torque meter comprises a section 3 of reduced diameter. A torque applied to the shaft will turn the shaft 1 substantially in the region of this reduced diameter section 3. The section 3 of reduced diameter is bridged by a sleeve 2 which is mounted against rotation and axial displacement on the sections of the shaft 1 adjoining both sides of the section 3 of reduced diameter.

By means of a circumferential slot 41, the sleeve is divided into two sleeve segments 4, 5. Two lugs 6, 7 are arranged in the slot 41. Each lug is connected at one end to one sleeve segment 4 by way of a web 8 and to the other sleeve segment 5 by way of another web 9. The webs 8, 9 extend circumferentially at least in sections. At the other end of the lug, there is a bearing point 10, 11 to which an armature 12 can be secured.

Figure 1:
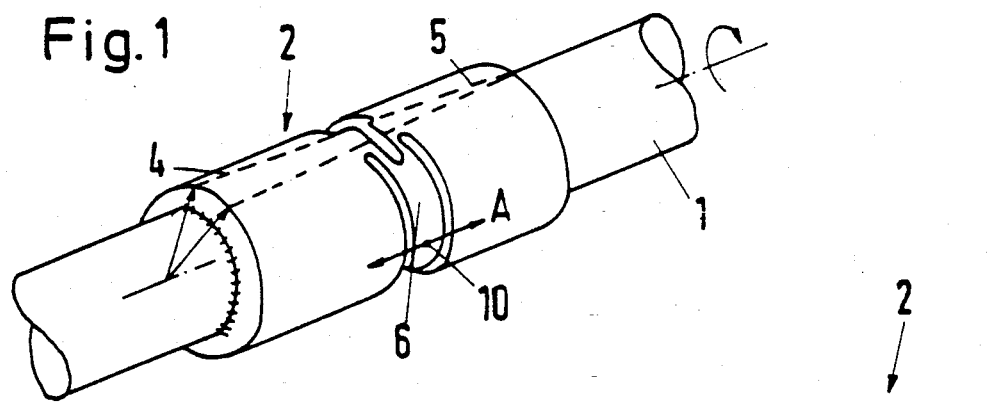
FIG. 1 is a perspective view of a torque meter with sleeve.
Figure 2:
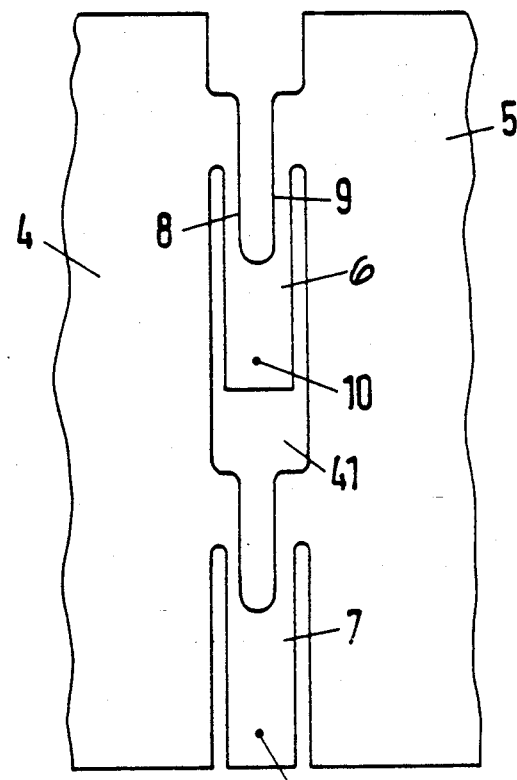
FIG. 2 is a developed view of part of the sleeve.

If, now, a torque acts on the shaft 1, the two sleeve segments 4, 5 are turned relatively to each other. Regarding, say, FIG. 2, the sleeve segment 4 moves downwardly and the sleeve segment 5 upwardly. The two lugs 6, 7 are displaced out of their positions parallel to the two sleeve segments 4, 5 and the ends receiving the armature 12 at the bearing points 10, 11 are moved to the right. The two webs 8, 9 give a little resiliently and thereby bring about length compensation, which is necessary because the projection of the end of the lugs 6, 7 connected to the sleeve segments 4, 5 becomes shorter when the lugs move in the direction of the arrow A (FIG. 1). The closer the sleeve segments 4, 5 to each other, i.e. the narrower the gap 41, and the longer the lugs 6, 7, the larger will be the deflection of the bearing points 10, 11 when the two sleeve segments 4, 5 are turned relatively to each other. Theoretically, it is sufficient to provide a single lug. In practice, however, it has been found advantageous to provide two lugs 6, 7 which support the armature 12 at diametrically opposite points. This substantially ensures that the armature will always remain coaxial with the shaft 1. The entire sleeve, i.e. the two sleeve segments 4, 5 and the lugs 6, 7, are preferably made in one piece. For example, in the developed condition, the sleeve may be stamped out of sheet metal and then wound about the shaft. This manner of manufacture results in a sleeve which is substantially homogeneous and therefore exhibits no or only very small hysteresis properties. Irrespective of whether the torque acts on the shaft 1 in the positive or negative direction, there will always be uniform deflection of the armature 12 by the lugs 6, 7. The omission of connections between the two sleeve segments 4, 5 and the lugs 6, 7 provides a system which is very stable mechanically and subject to few faults. By choosing a suitable length for the webs 8, 9, one can ensure that the deformation of the sleeve 2 caused by turning the two sleeve segments 4, 5 remains in the elastic zone, namely in a region which, even upon repeated movement does not lead to fatigue failure. The lugs 6, 7 lie in the cylindrical surface in which the sleeve segments 4, 5 are disposed.

To determine the axial movement of the armature 12 there is a coil arrangement 13 comprising a primary coil 14 and two secondary coils 15, 16. The three coils are concentric to the shaft 1, i.e. they surround the shaft 1. The primary coil 14 is disposed between the two secondary coils 15, 16. All three coils are interconnected by a coil carrier 17 which may, for example, be of plastics or hard paper. The coil carrier 17 is rotatably mounted on the sleeve 2 with the aid of two bearings 18, 19. The bearings 18, 19 are preferably slip-free ballbearings, i.e. bearings without axial play. The inner ring 20 of the bearing is secured on to the sleeve 2 whereas the outer ring is connected to the coil carrier 17. Such mounting ensures that the shaft 1 can turn whilst the coil arrangement 13 remains stationary. Coil terminals 22, 23, 24 can therefore be led out of the coils 14, 15, 16 without difficulty in order to transmit electric input and output signals to or from the evaluating means. In the axial direction, the coil arrangement 13 is so mounted that, in the rest position, i.e. in the absence of an external torque on the shaft 1, the armature 12 is precisely symmetrical to the primary coil 14 and the two secondary coils 15, 16.

The function of the coil arrangement will be evident from FIG. 4. The primary coil 14 is traversed by a current and thus produces a magnetic field which is indicated by the arrows 25, 26. This magnetic field passes through the two secondary coils 15, 16 and there induces an electric voltage. The electric voltage depends, inter alia, on how many coil windings are intersected by the magnetic field. The armature 12, which is of magnetically conductive material, conducts the field. In the rest or neutral position, the armature enters both secondary coils 15, 16 to the same extent. The same voltage is therefore induced in both secondary coils. When the two voltages are substracted from one another, the signal zero appears at the output and this shows that no torque is acting on the shaft. By displacing the coil arrangement 13 relatively to the armature 12 in the direction of the arrow B or, with the same effect, the armature 12 relatively to the coil arrangement 13, the symmetrical field distribution is upset. In the secondary coil into which the armature 12 enters more deeply, a larger number of coil windings is intersected by the magnetic field than in the other secondary coil out of which the armature 12 has been pulled some distance further. A larger voltage is therefore induced in the first secondary coil than in the second. By forming a simple differential of the two voltages, one can obtain an electric signal which indicates the size of the torque acting on the shaft. The signal can be amplified by increasing the excitation of the primary coil 14. The only limit for this is the saturation of the armature. To exclude interferences, the sleeve 2 is made of non-magnetic, i.e. magnetically non-conductive, material. Influencing of the magnetic field 25, 26 excited by the primary coil 14 will then take place exclusively by the armature 12. It may also be of advantage for the sleeve 2 to be made from an electrically non-conductive material to prevent the induction of eddy currents which could likewise bring about parasitic or interfering magnetic fields.

It will be evident from the foregoing explanations that very high requirements are placed on the absence of play in the bearings 18, 19 in the axial direction. Displacement of the armature 12 as a result of axial play in the bearings 18, 19 would otherwise indicate a wrong torque. To reduce the requirements for the absence of play in the bearings 18, 19, one can, as shown in FIG. 5, provide compensating means comprising a second coil arrangement 28 which is substantially identical with the first coil arrangement 13. This second coil arrangement comprises a primary coil 29 and two secondary coils 30, 31 disposed in a common coil carrier 32. A second armature 27 mounted on the shaft projects symmetrically into the two secondary coils 30, 31 of the second coil arrangement 28. The first coil arrangement 13 and the second coil arrangement 28 are interconnected by a common holder 33. The common holder 33 ensures that the axial spacing between the first coil arrangement 13 and the second coil arrangement 28 will always be kept constant. The second coil arrangement 28 determines together with the armature 27 whether or not the shaft 1 has moved axially relatively to the coil arrangements 13, 28. When the shaft 1 moves axially, the symmetrical distribution of the magnetic field in the second coil arrangement 28 is upset. To the same extent, the symmetrical field distribution in the first coil arrangement 13 is also upset. If the same interferences occur in both coil arrangements, this is an indication that a signal resulting therefrom in the first coil arrangement 13 was caused by axial displacement of the shaft 1 and not by a torque applied to the shaft. By means of suitable electric connections, therefore, wrong signals caused by axial displacement can be compensated.

FIG. 6 shows a further embodiment of a coil arrangement for determining axial movement of the armature. Parts corresponding to those in FIGS. 1 to 5 are provided with reference numerals increased by 100. The primary coil 114 is disposed around the center limb of an E-shaped yoke 34 whereas the two secondary coils 115, 116 are arranged about the two outer limbs of the E. The armature 112 passes the central limb 43 of the yoke at a constant air gap 42 and has air gaps 35, 36 with respect to the two outer limbs 44, 45. Upon moving the armature in the direction of the arrow A the two air gaps 35, 36 change in opposite senses. The primary coil 114 induces a magnetic field which crosses the air gap 42 and is led through the armature 114, the air gaps 135, 136 and the two outer limbs 44, 45 of the yoke through the coils 115, 116. In this case the entire flux of the magnetic field is permanently passed through the two secondary coils 115, 116. By changing the air gaps 35, 36, one can, however, change the magnetic resistance of the magnetic circuit formed by the armature 112, air gaps 35, 36 and E-shaped yoke 34, so that, with the magnetic field staying the same, the magnetic flux through the two secondary coils 115, 116 and thus the voltage induced therein are changed. If, for example the armature 112 moves to the right, the right hand air gap 36 is reduced and the left hand air gap 35 is increased. Consequently, a stronger magnetic flux flows through the secondary coil 116 than through the secondary coil 115. The voltage induced in the secondary coil 116 therefore becomes larger. With suitable dimensioning of the two air gaps 35, 36, the resistance of the magnetic circuit is practically exclusively determined by the two air gaps. One thereby achieves a good approximation of a linear behaviour for the voltages depending on the movement of the armature 112 in the direction of the double arrow A.

FIG. 7 illustrates a further possibility for compensating influences caused by axial play in the bearings 18, 19. To prevent magnetic influences from entering the coil arrangement 13 from the exterior, the entire coil arrangement is surrounded by a cap 37. This cap is secured on the sleeve 2 or on the shaft 1 fixed against rotation and axial displacement. To compensate axial movement of the coil arrangement 13 relatively to the sleeve 2, the cap 37 has a compensating air gap 38. This air gap extends circumferencially and divides the cap into two segments 39, 40. The remaining construction of this example corresponds to that of FIG. 3.

The compensating effect of this cap will be evident from FIGS. 8a and 8b. In the normal condition, i.e. without relative displacement between the coil arrangement 13 and sleeve 2 caused by axial play, in the neutral position the cap 37 as well as the armature 12 will be symmetrical to the primary coil 14 and the two secondary coils 15, 16. In the left hand secondary coil 15, a region a is intersected by the magnetic field. In the right hand secondary coil 16, a region b is intersected by the magnetic field. Both regions a and b are of equal size so that in both secondary coils 15, 16 the same number of coil windings is intersected by the magnetic field. Since the cap 37 is also symmetrically arranged with respect to the primary coil 14, an overall symmetrical magnetic field construction is obtained. The magnetic resistance in both circuits is equal around the two secondary coils.

If, now, the coil arrangement 13 is displaced as a result of axial play in the bearings 18, 19 relatively to the sleeve 2, there will not only be relative motion with respect to the armature 12 but also with respect to the cap 37. The armature will now, for example, enter the left hand secondary coil 15 more deeply, namely over a zone a′, whereas the depth of entry b′ in the right hand secondary coil 16 is reduced. This would normally cause an increase in the induced voltage in the left hand secondary coil 15 whereas the induced voltage in the right hand secondary coil 16 would be reduced. However, the cap 37 was simultaneously displaced to the left relatively to the coil arrangement so that the right hand cap segment 40 is pushed more closely to the primary coil 14. The resistance of the magneic circuit passing through the right hand cap segement is therefore lower than the resistance of the magnetic circuit passing through the left hand cap segment 39. As a result, a larger number of coil windings are intersected by the magnetic field in the left hand secondary coil 15 but the magnetic flux in the right hand secondary coil 16 is larger by reason of the lower magnetic resistance, so that the same voltage can be induced in the right hand secondary coil 16 even though a smaller number of coil windings is intersected here. Thus, with suitable dimensioning, the same voltage is induced in both secondary coils even with axial displacement of the coil arrangement 13 relatively to the sleeve 2 if no torque is otherwise exerted on the shaft 1.

We claim:

1. A torque meter comprising an axial extending shaft having a central axis, a first end portion, an axial intermediate portion, and a second end portion, the shaft intermediate portion being of a reduced diameter relative to the shaft first and second end portions, an axial extending sleeve having a first end portion secured in fixed relationship to the shaft first end portion, a second end portion secured in fixed relationship to the shaft second end portion, and an intermediate portion, the sleeve end portions being fixed to the respective shaft end portion in fixed angular and axial displacement relative to the adjacent shaft end portion, the sleeve intermediate portion having first means to axially segment the sleeve first end portion from the sleeve second end portion to permit rotation of the sleeve (shaft) end portions relative to one another and define a first lug having a first end portion axially separated from the sleeve (shaft) first and second end portions and a second end portion and at least one web portion for connecting the lug second end portion to each of the sleeve end portions, second means for providing one of a changeable electric field and a changeable magnetic field, and an armature mounted to the lug first end portion to change the field when one shaft end portion is rotated relative to the other.

2. A torque meter according to claim 1, wherein the first means comprises first and second circumferentially elongated slots in the sleeve that have first end portions and a third slot axially connecting the first and second slots first end portions to at least in part define the lug and to separate the sleeve first end portion from the sleeve second end portion and the lug has an axis of elongation that lies in a plane perpendicular to the shaft axis when the sleeve end portions are in non-rotated positions relative to one another.

3. A torque meter according to claim 1, wherein the at least one web portion extends at least partially circumferentially relative to the lug and the sleeve end portions.

4. A torque meter according to claim 1, wherein the sleeve intermediate portion includes a second lug that is circumferentially aligned with the first lug and is mounted to the armature.

5. A torque meter according to claim 1, wherein the sleeve is of a non-magnetic material.

6. A torque meter according to claim 1, wherein the sleeve end and intermediate portions are made from a single piece of material.

7. A torque meter according to claim 1, wherein the sleeve intermediate portion has a second lug in circumferential alignment with the first lug and has a first end portion, a second end portion, and a second web portion for connecting the second lug second end portion to each of the sleeve end portions, the first means comprises circumferentially elongated, axially opposite slots in the sleeve to axially separate the lugs from the sleeve end portions and a slot connecting the axially opposite slots circumferentially opposite the second lug second end portion.

8. A torque meter according to claim 1, wherein there is provided means for detecting a change in the field, the detecting means including at least one coil that is axially non-displaceable and unrotatable relative to the sleeve, and slip-free bearings having inner rings mounted to the respective shaft end portions and an outer ring mounting the at least one coil.

9. A torque meter according to claim 1, wherein the means for providing a field comprises a primary coil associated with the armature, and there is provided means for detecting a change in the field, the means for detecting the change in the field comprises secondary coils associated with the primary coil in a magnetically coupled relationship, the primary coil being axially intermediate the secondary coils, and a magnetically conductive cap surrounding the coils.

10. A torque meter according to claim 9, wherein the cap is connected to the sleeve in axial fixed relationship to the sleeve, the cap having at least one compensating air gap which upon axial displacement of at least one of the coils relatively to sleeve, changes the magnetic coupling between the primary coil and secondary coils in the opposite sense to influence by the armature.

11. A torque meter according to claim 10, wherein the cap has a circumferential gap adjacent to the primary coil to define the air gap.

12. A torque meter according to claim 11, wherein the gap is of an axial width that is at least twice the axial dimension of the primary coil.

13. A torque meter according to claim 1, wherein the sleeve has means connected to the armature to in cooperation with the lug axially move the armature when one shaft end portion is rotated relative to the other, there is provided means for detecting a change of field that comprises the means for providing the field and first and second secondary coils for providing an output signal, the means for providing the field includes a first primary coil for producing a magnetic field, whereby the axial movement of the armature changes the magnetic coupling between the primary and secondary coils.

14. A torque meter according to claim 13, wherein there is provided a second armature mounted to the shaft first end portion in axial fixed relationship thereto, and second secondary coil means for providing a magnetic coupling comprising a primary coil associated with the second armature, and second first and second secondary coils associated with the last mentioned primary coil, the second secondary coil means being connected to the first coil arrangement which includes the first primary coil and the first and second secondary coils in constant axial spacing.

15. A torque meter according to claim 13, wherein the first primary coil surrounds the sleeve radially outwardly of the armature and is axially intermediate the first secondary coils, and the armature is at least partially within the first primary coil and is formed of a magnetically conductive material.

16. A torque meter according to claim 13, wherein there is provided an E-shaped core that is associated with the armature and has an axial center limb and first and second outer limbs axially opposite the center limb, and said first secondary coil on the first outer limb and said second secondary coil on the second outer limb, the armature being disposed relative to the core to provide a constant air gap with respect to the center limb and between the outer limbs.

* * * * *